United States Patent [19]

Lichti

[11] 4,068,965

[45] Jan. 17, 1978

[54] SHAFT COUPLING

[75] Inventor: Robert D. Lichti, Lakewood, Calif.

[73] Assignee: CraneVeyor Corporation, South El Monte, Calif.

[21] Appl. No.: 739,468

[22] Filed: Nov. 8, 1976

[51] Int. Cl.² .............................................. F16D 1/04
[52] U.S. Cl. .................................... 403/313; 403/344; 403/356
[58] Field of Search ............... 403/309, 310, 311, 312, 403/313, 356, 373, 344, 358, 318, 290, 366

[56] References Cited

U.S. PATENT DOCUMENTS

| 47,388 | 4/1865 | Briggs | 403/309 |
| 73,100 | 1/1868 | Hubbard | 403/309 |
| 111,152 | 1/1871 | Smith | 403/312 |
| 292,978 | 2/1884 | Braun | 403/309 |
| 485,350 | 11/1892 | Morrow | 403/290 |
| 711,284 | 10/1902 | Carey | 403/318 |
| 1,830,976 | 11/1931 | Ashworth | 403/366 |
| 3,680,404 | 8/1972 | Firth | 403/118 X |

Primary Examiner—Andrew V. Kundrat

[57] ABSTRACT

A single piece coupling for shafts comprises opposite half sections each with an arcuate recess for engaging one side of two axially aligned shafts. There are also spaces forming a keyway for reception of a conventional key with which the shafts are provided. The half sections are initially formed in a spread apart condition with captive edges secured to each other by a section of the coupling metal forming thereby a hinge. After adjacent ends of the shafts are slid into the coupling to abutting positions free edges of the half sections are bolted together drawing the half sections simultaneously into engagement with the shafts and the key.

7 Claims, 4 Drawing Figures

U.S. Patent  Jan. 17, 1978  4,068,965
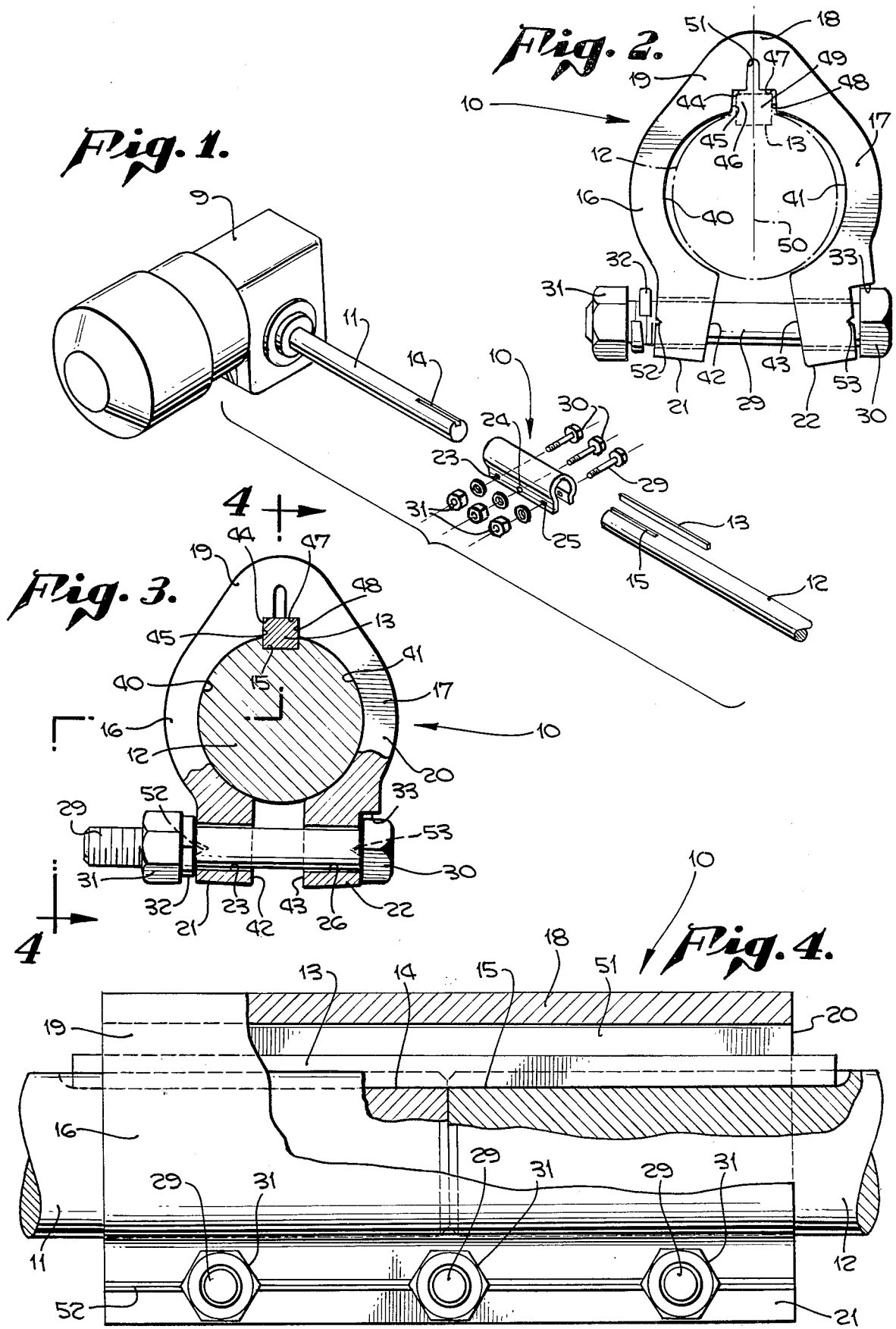

SHAFT COUPLING

Conventional shaft couplings used primarily for connecting a drive shaft with another shaft for operating some appropriate mechanism feature two separate half sections, usually made of an appropriate alloy of cast iron, make use of an arcuate recess in each half, and with a keyway milled or otherwise formed in the center of one of the half sections. The two half sections have complementary flanges at each end which are bolted together to clamp the coupling to the shaft by use of as many as eight bolts. Normally there are circumferential reinforcing ribs having a depth such that the outer edge of the ribs are substantially flush with the outer edges of the flanges. One of the difficulties with a coupling of this kind is the problem involved in forming a keyway of precise depth and breadth so that when the two half sections of the coupling are coupled together sufficient pressure, but not too much pressure, will be applied to the outer surface of the key to prevent the key from wallowing over long periods of operation. The technique made necessary in employment of two part couplings of the kind made reference to is such that they cannot be constructed so as to apply pressure against the sides of the key which protrude outwardly from the keyways in the shaft but only at the outside surface.

Further still in making two part couplings of this description each coupling in turn requires careful machining so that the coupling halves match as nearly as possible in order to provide an effective fit and to keep the masses in balance thereby to minimize possible vibration during operation.

By reason of the fact that the half sections are separate parts which must be held together for insertion and tightening of the bolts, application of the coupling to abutting axially aligned shafts is time consuming operation. As a consequence the use and installation of such conventional two piece couplings is relatively expensive not only because of the expense involved in the initial machining of the separate half sections but also by reason of the time consumed in making up the couplings, and releasing the couplings when it becomes necessary to uncouple the parts and subsequently recouple them.

It is therefore among the objects of the invention to provide a new and improved unitary shaft coupling wherein opposite half sections are physically joined together along one edge so that to apply the coupling to a pair of axially aligned shafts only the opposite edges need to be clamped together.

Another object of the invention is to provide a new and improved unitary shaft coupling which makes special provision for clamping on exposed surfaces of a key thereby to so effectively secure the key in the keyways respectively of the shafts and coupling that there will be little or no tendency for the key to wallow during long periods of use.

Another object of the invention is to provide a new and improved unitary coupling wherein half sections are joined together by a portion of the metal from which they are formed in a hinge-like relationship spread apart sufficiently so that the shaft ends can be readily slid into the coupling, and wherein the unitary coupling can be formed of an extruded section for cutting into appropriate lengths, the extrusion being such that an effective snug and dependable coupled joint can be made with virtually a minimum number of bolt action clamping devices.

Still further among the objects of the invention is to provide a new and improved unitary shaft coupling which by reason of being extruded in a single piece, is one capable of being produced at a cost materially less than couplings heretofore available for a comparable purpose and which also is of such design and construction that application time also is reduced to virtually a minimum.

With these and other objects in view, the invention consists in the construction, arrangement, and combination of the various parts of the device, whereby the objects contemplated are attained, as hereinafter set forth, pointed out in the appended claims, and illustrated in the accompanying drawings.

FIG. 1 is a side perspective exploded view of the coupling and shafts.

FIG. 2 is an end elevational view of the coupling in uncoupled position.

FIG. 3 is an end elevational view of the coupling partially broken away in coupled position on a shaft.

FIG. 4 is a side elevational view partially broken away taken on the line 4 — 4 of FIG. 3.

In an embodiment of the invention chosen for the purpose of illustration a unitary coupling is indicated generally by the reference character 10 and is adapted to clamp or couple together two shafts, 11 and 12 which share a common key member 13. In the shaft 11 is a keyway 14 which, when the shafts are to be coupled, is in axially alignment with a keyway 15 in the shaft 12. A motor 9 is shown by way of illustration.

The unitary coupling consists in general of a left half section 16 and a right half section 17 as viewed in general in FIGS. 2 and 3, the half sections being interconnected by a hinge 18 of the same material at respective captive ends 19 and 20.

At the opposite or free end 21 of the half section 16 is a flange 21 and at the corresponding free end of the half section 17 is a flange 22.

In the flange 21 are three bolt holes 23, 24, and 25 and the holes 23, 24, and 25 are in alignment with respective bolt holes 26 in the flange 22. The bolt holes paired as shown and described accommodate the shaft of bolts 29, each of which is provided with a conventional head 30 at one end and adapted to have attached at the other end a nut 31 applied over a lock washer 32. The flange 22 is provided with a shoulder 33 which clears respective flat sides of nuts 30, here shown in hexagonal form, so that when the bolts are inserted from the proper side the shoulder will prevent the bolts from turning as the nuts are applied tightly into position.

There are some significant and to a degree critical elements in the design and structure of the unitary coupling, not dimensionally apparent in substantial degree in the patent drawings but which are significant for effective performance.

For example the unitary coupling is one adapted to be formed by extruding the material of the coupling so that it has the cross-sectional configuration shown in FIGS. 2 and 3. When extruded in this fashion the extrusion can be of virtually any length and then cut to provide a unitary coupling of the length desired. One equipped with three bolt holes for the accommodation of three bolts has been chosen merely by way of example. On some occasions the coupling may perform effectively with as few as two bolt holes whereas on other occasions an even longer coupling might be found desirable with more than three bolt holes.

To have the opposite half sections effectively engage respective opposite sides of the shafts 11 and 12 the half section 16 is formed with an inside or concave arcuate surface 40 which is something less than half the circumference of the corresponding shaft. A similar arcuate surface 41 is formed in the right hand half section 17. Additionally the flange 21 of the left hand half section has a flat face 42 extending obliquely in FIG. 2 like the face 43 of the flange 22. The obliqueness or angularity of the flat faces is calculated so that when the half sections are brought into engagement with the shafts the flat faces will be in a position substantially parallel to each other although spaced from each other by an appreciable distance as shown in FIG. 3.

In a similar fashion adjacent the captive end 19 of the half section 16 has surfaces 44 and 45 joining each other at a right angle and forming a space 46. Similarly at the captive end 20 of the half section 17 are surfaces 47 and 48 which join at a right angle and form a space 49. The spaces 46 and 49 together form a keyway for accommodation of the portion of the key 13 which is exposed with respect to the keyways 14 and 15 and the respective shafts 11 and 12.

Actually the surfaces 45 and 48 in the initial spread open form of the unitary coupling are not parallel to each other but instead are tilted angularly outwardly, each at an angle of for example, 1° from a radial line 50, this chosen relationship making an aggregate angular spread of 2° between the faces. Under the circumstances described, and with surfaces 44 and 45 making a true right angle as well as spaces 47 and 48 making a true right angle the surfaces 44 and 47 will also be tilted slightly when the unitary coupling is in its initial open position. Although a 1° and 2° angle has been described the angular tilt may be slightly more or even slightly less on some occasions depending upon the size of the coupling. Similarly the angular tilt of the surfaces 44 and 47 for the 1° obliquity described may be of the magnitude of about ½° or on some occasions precisely 40', this tilt varying correspondingly depending on the degree of obliquity of the surfaces 45 and 48.

In addition to the spaces 46 and 49 there is also initially formed a slot 51 which extends radially outwardly from the spaces 46 and 49, the breadth of the slot 51 being less critical. It is however of some consequence that the captive ends 19 and 20 extend radially inwardly where they join to form the hinge 18 so that there will be ample thickness of material in the hinge, the thickness being about equal to the average thickness of the arcuate portions of the half sections 16 and 17.

As a further convenience in extruding the unitary coupling body to make certain of the subsequent finishing steps being accurate, a groove 52 is provided in the flange 21 and a similar grove 53 in the flange 22. These grooves provide a more accurate locating of the center points of the bolt holes 23, 24, 25 in the flange 21 and bolt holes 26, 27, and 28 in the flange 22. The form and pertinences of the unitary coupling, as just described, may be carefully built into the extrusion die so that the form and all of the relationships made reference to are inherently built into the extruded section thereby avoiding need for subsequent machining except for the drilling of the bolt holes.

When the unitary coupling 10 is to be applied to couple together abutting ends of the shafts 11 and 12 the coupling is slid over one of the shafts far enough back to permit insertion of the key 13 in the respective keyways 14 and 15 when the shafts are moved into abutting relationship. The unitary coupling can then be shifted endwise so that the keyway formed by the spaces 46 and 49 slides freely over the protruding portion of the key 13 at the same time that the half sections and their respective arcuate surfaces 40 and 41 slide freely over the respective side surfaces of the shafts until the middle bolt hole 24 align with the abutting ends of the shafts.

After this has been accomplished the bolts 29 are inserted in the matching bolt holes, stop washers and nuts applied and the nuts progressively tightened. As tightening progresses the opposite half sections 16 and 17 are drawn toward each other and at the same time the surfaces 45 and 48 are pressed laterally against the respective side faces of the key 13. Also simultaneously the surfaces 44 and 47 are drawn radially inwardly against the corresponding end face of the key 13, there being ample breadth to the slot 51 so the action just described can take place without restriction. By the time the arcuate surfaces 40 and 41 are drawn snugly into engagement with the respective side faces of the shafts clamping of the surfaces against the key 13 is complete and the flat faces 42 and 43 have been drawn close enough together to then be in substantially spaced parallel relationship. The coupled shafts are then ready for operation.

It can be appreciated that in the structure described the initial forming of the unitary coupling is very simple and correspondingly inexpensive, inasmuch as the surfaces need no subsequently machining, having been accurately formed by the extrusion process. Furthermore, virtually a minimum number of bolts are needed, applied at one edge only of the half sections, the other edges of the half sections being initially and finally joined together by the hinging. Disengagement is equally simple needing removal only of the three bolts at which time the half sections spring apart.

Having described the invention what is claimed as new in support of Letters Patent is as follows:

1. A unitary coupling for non-rotatably connecting axially aligned shafts which have keyways in axial alignment and a key member for said keyways, said coupling comprising an integral single piece body of resilient material having opposite complementary half sections with inside arcuate surfaces adapted for engagement with laterally opposite sides of the shafts, said half sections having adjacent captive ends and a hinge of said material joining said ends, portions of said captive ends having a slot therebetween adjacent said hinge, each of said captive ends having surfaces forming a corner with a space between said surfaces and said spaces together forming a keyway adjacent said slot, complementary flanges on respective free ends of said half sections including fastening means, said half sections having an initial relationship extending at an acute angle outwardly relative to each other from the hinge wherein portions of said arcuate surfaces are spaced at progressively varying distances from the respective sides of the shaft and portions of said surfaces at the corner are spaced at progressively varying distances from said key member to enable the body to be placed over and clear of the shafts before clamping, said half sections being adapted to be drawn toward each other and toward said key member and the shaft progressively from the captive ends to the free ends by use of said fastening means whereby the arcuate surfaces engage the shafts and the surfaces at the corners engage the key member.

2. A unitary coupling as in claim 1 wherein a portion of said body adjacent said hinge has a thickness exceeding the thickness of said half sections adjacent said arcuate surfaces whereby to provide a mass of said material adjacent the slot for forming said hinge.

3. A unitary coupling as in claim 1 wherein each of said flanges has a thickness not less than the thickness of the half section adjacent said arcuate surface and said fastening means comprises a plurality of bolt holes in each flange.

4. A unitary coupling as in claim 3 wherein there is a recess in at least one of the flanges adjacent the bolt holes forming a shoulder for engagement with bolt heads.

5. A unitary coupling as in claim 1 wherein surfaces forming the corners which are adapted to engage an outwardly facing side of said key member are spaced from adjacent end portions of the respective arcuate surfaces a distance no greater than a portion of the key member outside the keyways whereby the clamping of said half sections on the shaft is accompanied by a clamping of said key member in said keyways.

6. A unitary coupling as in claim 1 wherein there are faces on the respective flanges which are flat and which when the half sections are in clamped position on the shafts are in close substantially parallel relationship.

7. A unitary coupling for non-rotatably connecting axially aligned shafts which have keyways in axial alignment and a key member for said keyways, said coupling having an integral single piece body comprising an extrusion of resilient material having opposite complementary half sections with inside arcuate surfaces adapted for engagement with laterally opposite sides of the shafts, said half sections having an initial relationship at an acute angle with respect to each other whereby there are adjacent captive ends and a hinge of said material joining said ends, portions of said captive ends having a slot therebetween adjacent said hinge, each of said captive ends having extruded surfaces forming a keyway adjacent said slot, complementary flanges on respective free edges of said half sections including fastening means, said half sections having an initially extended relationship wherein said arcuate surfaces have respective centers of curvature spaced from each other and said surfaces are spaced from the respective sides of the shaft, said surfaces at the corner being spaced from said key member to enable the body to be placed over the shafts and the key member before clamping, said half sections being adapted to be drawn toward each other by use of said fastening means whereby the arcuate surfaces engage the shafts and the surfaces at the corners engage the key member.

* * * * *